(12) United States Patent
    Wang

(10) Patent No.: US 10,906,826 B2
(45) Date of Patent: Feb. 2, 2021

(54) METHODS AND APPARATUSES FOR WATER, WASTEWATER, AND WASTE TREATMENT

(71) Applicant: Jianmin Wang, Rolla, MO (US)

(72) Inventor: Jianmin Wang, Rolla, MO (US)

( * ) Notice: Subject to any disclaimer, the term of this patent is extended or adjusted under 35 U.S.C. 154(b) by 452 days.

(21) Appl. No.: 15/178,921

(22) Filed: Jun. 10, 2016

(65) Prior Publication Data

US 2016/0304370 A1    Oct. 20, 2016

Related U.S. Application Data

(63) Continuation-in-part of application No. 13/891,830, filed on May 10, 2013, now Pat. No. 9,938,173, which is a continuation-in-part of application No. 13/567,850, filed on Aug. 6, 2012, now abandoned.

(60) Provisional application No. 61/525,760, filed on Aug. 20, 2011, provisional application No. 61/521,653, filed on Aug. 9, 2011, provisional application No.
(Continued)

(51) Int. Cl.
| | |
|---|---|
| *C02F 3/12* | (2006.01) |
| *C02F 3/02* | (2006.01) |
| *C02F 3/30* | (2006.01) |
| *C02F 3/22* | (2006.01) |
| *B01F 3/04* | (2006.01) |
| *F17D 1/00* | (2006.01) |
| *C02F 3/28* | (2006.01) |
| *C02F 1/28* | (2006.01) |

(52) U.S. Cl.
CPC ........ *C02F 3/1284* (2013.01); *B01F 3/04531* (2013.01); *C02F 3/02* (2013.01); *C02F 3/223* (2013.01); *C02F 3/303* (2013.01); *C02F 3/308* (2013.01); *F17D 1/00* (2013.01); *B01F 2003/04879* (2013.01); *B01F 2003/04943* (2013.01); *B01F 2215/0052* (2013.01); *C02F 1/283* (2013.01); *C02F 3/2893* (2013.01); *C02F 3/301* (2013.01); *C02F 3/302* (2013.01); *C02F 2209/14* (2013.01); *C02F 2209/22* (2013.01); *Y02W 10/10* (2015.05)

(58) Field of Classification Search
None
See application file for complete search history.

(56) References Cited

U.S. PATENT DOCUMENTS

| | | |
|---|---|---|
| 5,217,617 A | 6/1993 | Duncan |
| 6,569,338 B1 | 5/2003 | Ozyboyd |
| 7,014,769 B1 | 3/2006 | Cox |
| (Continued) | | |

*Primary Examiner* — Michael H. Wilson
*Assistant Examiner* — Katherine A Will
(74) *Attorney, Agent, or Firm* — C. John Brannon; Brannon Sowers & Cracraft PC

(57) ABSTRACT

Described herein are methods and devices for treating water, wastewater, and organic wastes. The methods and devices are mixed by using hydraulic surge mixers. This surge mixer is driven by gas and can provide occasional surges of water using large bubbles which are able to move great volume of liquid while minimizing dissolved oxygen transfer to the surrounding liquid. Use of the devices and processes herein provides a simple, eloquent approach to water and wastewater treatment with less operation and maintenance costs than conventional devices and/or processes. The same surge lifting device can also be installed in other reactors to mix the tank content and enhance reaction with reduced energy use and maintenance needs.

16 Claims, 12 Drawing Sheets

Related U.S. Application Data

61/515,967, filed on Aug. 7, 2011, provisional application No. 61/515,855, filed on Aug. 6, 2011.

(56) References Cited

U.S. PATENT DOCUMENTS

| | | | |
|---|---|---|---|
| 8,622,222 B2 * | 1/2014 | Zha | B01D 63/024 210/106 |
| 2001/0045390 A1 | 11/2001 | Kim et al. | |
| 2002/0113011 A1 | 8/2002 | Ricketts | |
| 2005/0098497 A1 | 5/2005 | Khudenko | |
| 2006/0081533 A1 | 4/2006 | Khudenko | |

* cited by examiner

METHODS AND APPARATUSES FOR WATER, WASTEWATER, AND WASTE TREATMENT

CROSS-REFERENCE TO RELATED APPLICATIONS

This application is a Continuation-in-Part of and claims priority to US. Continuation-in-Part patent application Ser. No. 13/891,830, filed May 10, 2013, which claims priority to U.S. patent application Ser. No. 13/567,850, filed Aug. 6, 2012, which claims priority to U.S. Provisional Patent Application No. 61/515,855, filed Aug. 6, 2011; U.S. Provisional Patent Application No. 61/515,967, filed Aug. 7, 2011; U.S. Provisional Patent Application No. 61/521,653, filed Aug. 9, 2011; and U.S. Provisional Patent Application No. 61/525,760, filed Aug. 20, 2011.

BACKGROUND

Appropriate mixing during biological water, wastewater, and waste treatment can disperse microorganisms within the reactor and make the entire reactor volume active. Existing mixing methods for anaerobic and anoxic biological reactors include mechanical mixers and conventional air (or gas) mixers. Mechanical mixers have mechanical energy loss, and need more maintenance because it uses a motor to drive the impeller or propeller. In case of anaerobic digesters that need completely sealed tanks for the reaction, using a mechanical mixer is troublesome because the motor has to be outside of the tank, and there is a leaking potential at the mixer entry point. In some cases, mechanical mixing method could shear the highly active granular sludge or other added media that is used to aid the reaction. Conventional air (or gas) mixers use air or gas to mix the tank, and air or gas is continuously released to the tank. Air mixing is relatively mild. In addition, conventional air mixers can not be used to mix anaerobic or anoxic reactors for biological nutrient removal processes because a sufficient amount of oxygen can be transferred to the liquid to inhibit the reaction.

As a result, a preferred method to mix biological reactors needs to (a) effectively prevent particle accumulation at the bottom and/or on the top of the reactor; (b) not adversely impact the reaction by damaging the granular sludge or added media through shearing or by introducing inhibiting components, etc.; and (c) be simple to use.

Mechanical mixers inevitably have mechanical energy loss and also need regular maintenance. It may also negatively impact the reaction process by shearing or breaking the granular sludge or added media that is used to enhance the performance. On the other hand, regular air or gas mixing, although simple to use, does not have enough strength to prevent particle accumulation in a tank. If air is used, it may introduce oxygen to the tank, to inhibit anaerobic or anoxic biological reactions if these reactions are conducted within the tank. A new type of hydraulic mixing that is induced by gas (including air or biogas, or other gases), as long as it can provide a strong hydraulic force to prevent particle accumulation within the tank, will be a preferred method for mixing during the treatment of water, wastewater, organic waste, and in other biological processes.

FIG. 1 shows a conventional bioreactor. A mechanical mixer is used to mix the reactor contents. Under anaerobic condition, biogas may be produced. In this case, the tank is normally sealed and the biogas is collected as an energy source. However, for biological phosphorus removal process, the anaerobic reactor is used to cultivate phosphorus accumulating organisms (PAOs). In this case, the fermentation ends before the biogas production, and the tank is normally open to air. Under anoxic condition, the reactor is used to reduce nitrate and nitrite to form nitrogen gas, to remove nitrogen nutrient. The anoxic bioreactor is normally open to air. Nevertheless, conventional air mixing is not used for anaerobic or anoxic reactors, because oxygen in the air can transfer to the liquid in an amount that inhibits the anaerobic or anoxic reactions. In addition, conventional air mixing is too mild to mix the tank content.

FIG. 2 shows a conventional pre-anoxic process for biological nutrient removal. It has a continuously mixed anoxic zone for denitrification followed by a continuously aerated aerobic zone for organic matter degradation and nitrification. Mixed liquor in the aerobic zone is returned to the anoxic zone to provide nitrate, which is reduced to nitrogen gas within the anoxic zone. The effluent from the aerobic zone flows to a secondary clarifier for solids-liquid separation, and settled sludge in the secondary clarifier is returned to the anoxic zone to provide biomass needed for biological functions. The anoxic zone is normally continuously mixed using mechanical mixing devices.

FIG. 3 shows an airlift pump such as that disclosed in U.S. Pat. No. 6,162,020. It is driven by air, and can provide a strong, periodic lifting force to transfer water. During operation, the air is injected to the air chamber, and the air-water interface within the air chamber is pushed down gradually. Once the air-water interface reaches the elbow that connects the riser tube, the entire air volume within the air chamber is drown to the riser tube, creating an air plug within the riser tube. This air plug provides a strong force to lift water within the riser tube. This lifting action repeats, resulting periodic pumping action. Apparently this device can also be used to mix liquid if the outlet of the pump is submerged within the tank content. Compared to conventional airlift pumps, this device provides a significantly stronger hydraulic lifting and mixing intensity. Compared to the mechanical mixers, this mixer employs no mechanical moving parts, therefore is more energy efficient. However, the elbow that connects the air chamber and the riser tube could be easily clogged by debris contained in the wastewater during operation. Once clogged, cleaning the tube is very difficult because the top of the elbow is hidden within the air chamber, which is not readily accessible.

SUMMARY

The claimed technology is set forth in the claims below, and the following is not in any way to limit, define or otherwise establish the scope of legal protection.

One embodiment of the disclosed invention is a bioreactor apparatus and method that comprises one or more mixers that is driven by air or gas, providing a strong and periodic lifting force to mix or lift the reactor content. For convenience, this type of hydraulic mixing device is termed as surge lifting device or surge mixer herein. Optionally the disclosed bioreactor can be a section or a zone within a larger tank, or can be a separate tank. Baffles can be integrated into the bioreactor to create a static zone on the upper portion of the tank, to facilitate sludge settling and retention.

The disclosed bioreactor can optionally be operated under aerobic condition (with an additional aeration device) to perform organic matter degradation and nitrification, and the surge mixer is used to supplement the mixing of the aeration device if needed. For example, it can optionally be used to mix membrane bioreactor to reduce particle accumulation or fouling on the membrane surface. It can also be optionally used to mix other bioreactors packed with fixed media or moving media to remove the biofilm grown on the surface of the media. The disclosed bioreactor can optionally be operated under anoxic condition to perform denitrification. The anoxic bioreactor can optionally be placed before an aerobic zone or tank in a pre-anoxic process, and receive both influent and return mixed liquor from an aerobic zone or tank. The anoxic bioreactor can also be optionally placed after an aerobic zone or tank in a post-anoxic process. Optionally, multiple anoxic bioreactors can also be optionally placed before and after the aerobic zone or tank, to achieve more complete denitrification.

One example of the disclosed bioreactor can also be optionally operated under an anaerobic condition, used in conjunction with a down-stream aerobic zone, to culture PAOs for biological phosphorus removal. Optionally the disclosed anaerobic bioreactor can also be optionally used in conjunction with down-stream anoxic and aerobic bioreactors, to biologically remove organic pollutants, nitrogen and phosphorus.

In another example the disclosed anaerobic bioreactor can be used independently, to digest organic pollutants and solids. For example, it can be used to digest organic sludge and food waste to produce low molecular weight organic acids (acid-production step). This low molecular weight organic acids can be a carbon source for other biological reactions, such as, to enhance denitrification and biological phosphorus removal. It can also be used to complete the entire anaerobic process and produce methane gas. The methane gas produced within the anaerobic bioreactor can be collected as an energy source, and the entire bioreactor should be sealed. A biogas outlet may be installed at the top of the tank or in some other suitable locations. The biogas generated under the surge mixer within the bioreactor could drive the mixer automatically in another example. If this mixing frequency if not sufficient, the produced biogas can be recycled from the top of the tank back to the surge mixer to enhance mixing.

In other examples the disclosed bioreactors can also be modified by adding means to increase the sludge retention. For example, baffles can optionally be added on the upper portion of the reactor, to create a static zone before the tank content flows out of the tank. In this case, the content in the lower portion of the tank is recycled and mixed, while the upper portion of the tank serves as a sludge blanket filter or a clarifier.

The designs as the aforementioned bioreactors can be used for other applications, and different media can optionally be added to the reactor to enhance treatment. For example, plastic media or activated carbon (granular or powdered) can be added to the reactor, serving as the carrier of microorganisms. Membrane filter can also be used to retain biomass within the reactor. The hydraulic mixing from the surge mixer does not shear the added media but can also provide enough mixing and prevent sludge or particle accumulation. Similarly, other media such as zero valent ion, and coagulants can be added to the reactor to perform desired physical-chemical reactions. Multiple media can also be used (for example, powered activated carbon+coagulants) to enhance the reactor performance. Through baffle installation, a clarification zone is integrated to the reactor, to perform reaction and clarification within the same tank.

Yet another embodiment of the disclosed invention is a surge lifting device. It is an apparatus to create large diameter gas bubbles within a riser tube to provide high lifting potential periodically. It includes a gas collection chamber and a means to transfer gas to the riser. The gas collection chamber collects gas to a certain volume before periodically discharging them into the riser tube. As a result, a large gas plug forms within the riser, forcing the liquid within the riser to move upward via the buoyant force. This surge lifting device can be used for mixing tank content (surge mixer) and transferring liquid or liquid-solid mixture (surge pump). It can also be used to dredge sediments in rivers or lakes, and for other pumping applications.

Further objects, embodiments, forms, benefits, aspects, features and advantages of the claimed technology may be obtained from the description, drawings, and claims provided herein.

DESCRIPTION

Figure 1:
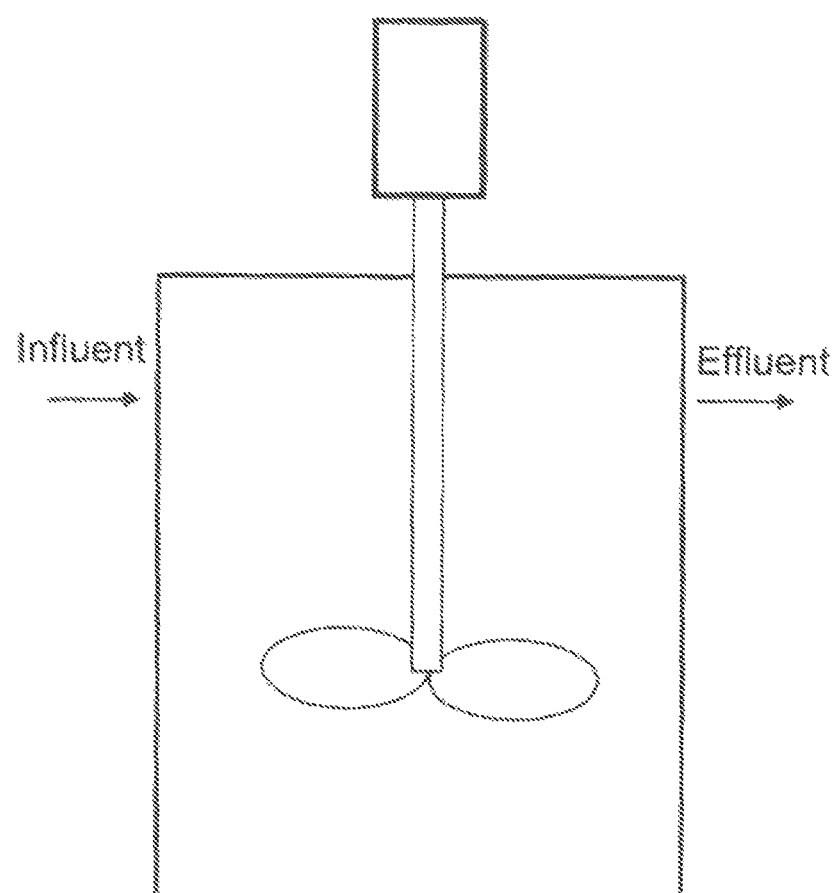
FIG. 1 is a flow diagram of a conventional anaerobic or anoxic bioreactor.
Figure 2:
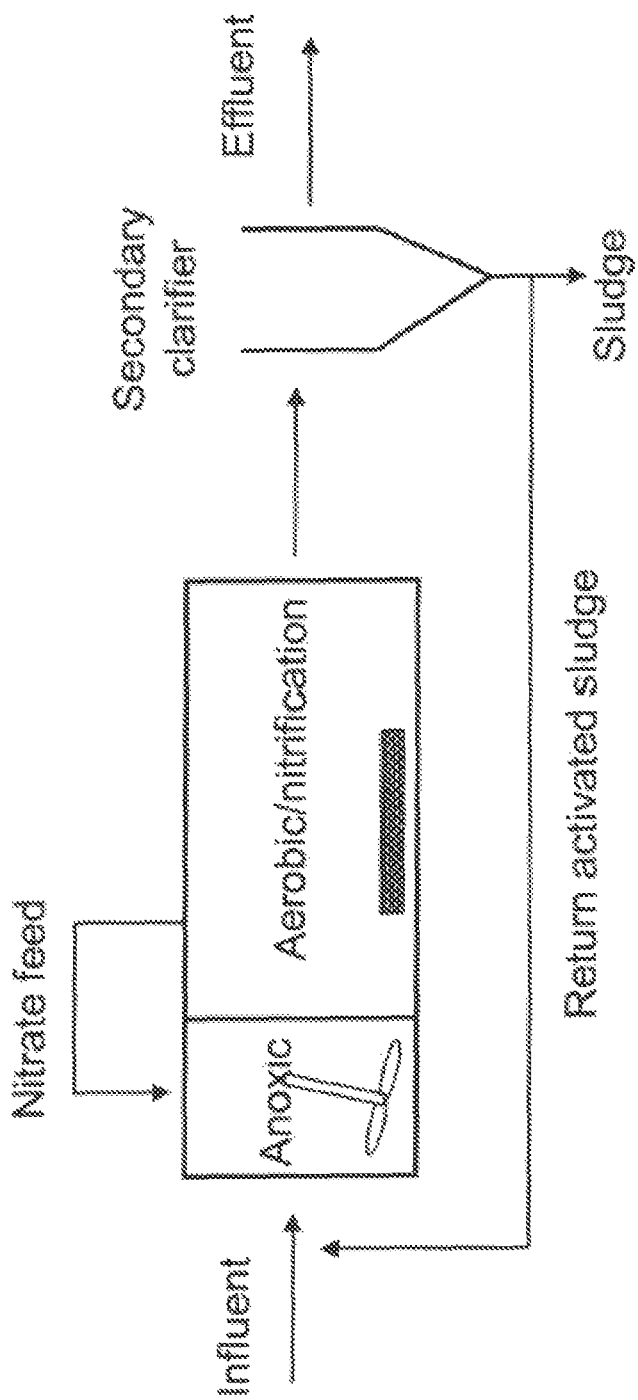
FIG. 2 is a flow diagram of a conventional pro-anoxic process.

For the purposes of promoting an understanding of the principles of the claimed technology and presenting its currently understood best mode of operation, reference will now be made to the embodiments illustrated in the drawings and specific language will be used to describe the same. It will nevertheless be understood that no limitation of the scope of the claimed technology is thereby intended, with such alterations and further modifications in the illustrated device and such further applications of the principles of the claimed technology as illustrated therein being contemplated as would normally occur to one skilled in the art to which the claimed technology relates.

Appropriate mixing is extremely important for biological treatment of water, wastewater, and waste. Conventional mixing methods, including mechanical mixing devices or air mixing devices, are continuously operated. Mechanical mixing devices need regular maintenance and could shear particulate matter that is formed or added during the treatment, and continuous-flow air mixing devices provide only mild local mixing. Instead, a hydraulic surge mixing device that is driven by air or gas can provide a periodic strong lifting action appropriate for mixing biological and some physical-chemical reactors. In one embodiment the disclosed device is nearly maintenance-free (like the regular airlift pumps), and can provide sufficient mixing, and is energy efficient (no mechanical energy wasting). The disclosed devices reduce shearing of particulate matter added or formed within the reactor, and optionally do not add meaningful amounts of oxygen to the reactor to inhibit anaerobic and anoxic reactions during application. Use of a hydraulic surge mixing device according to the disclosed invention benefits the existing treatment processes for water, wastewater, and organic wastes by reducing energy use, reducing maintenance requirements, and improving treatment performance.

Figure 4:
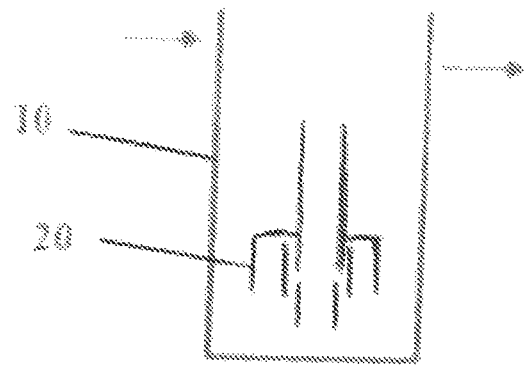
FIG. 4 is a cross sectional view of a bioreactor according to one embodiment of the disclosed invention.

FIG. 4 illustrates a cross-sectional side view of one embodiment of the disclosed invention. This example can be used for physical, chemical, and/or biological reactions. If used for biological reactions, the reactor is normally called bioreactor. The bioreactor of this example includes a tank (10) that contains one or more hydraulic surge mixers (20). The hydraulic surge mixers can optionally be driven by air or other gases. It can optionally be operated under aerobic, anoxic, or anaerobic conditions, depending on the needs. For example, the bioreactor can be operated under aerobic condition (with an additional aeration device), and the surge mixer provides supplemental mixing to the reactor. When membrane or other media is used to increase the biomass concentration and improve the reactor performance, this supplemental mixing can help to reduce particulate or biofilm accumulation. It can also be used before an aerobic reactor to perform denitrification under anoxic condition (pre-anoxic process). In this case the mixed liquor from the aerobic reactor should be returned to the anoxic bioreactor. It can also be used after an aerobic reactor, to perform denitrification under anoxic condition (post-anoxic process), with or without external carbon addition. Air is an example gas to drive the surge mixer, which has negligible adverse effect to the denitrification reaction because of the limited oxygen transfer within the surge mixer. A bioreactor according to the disclosed invention can also be used before and after an aerobic reactor to perform more complete denitrification. In addition, it can also be used independently to perform denitrification reaction as long as the influent has nitrate, and there is a carbon source in the influent or added externally. It can also be placed ahead of an aerobic or anoxic reactor in a biological phosphorus removal process, to culture PAOs under anaerobic condition. In this case air is also a gas used to drive the surge mixer without noticeable adverse effect on the bioreactor performance. Likewise, other gas can also be use. If the influent is rich in organic matter (high strength organic wastewater, algae, organic sludge such as in wastewater sludge, kitchen waste, human and animal waste, etc.), the reactor can be operated as an anaerobic digester to produce low molecular weight organic matter such as fatty acids (before methane formation step) which can be used as a carbon source for biological nutrient removal processes to remove nitrate and phosphorus. It can also be used to produce biogas (to complete the methane formation step), and serve as a biogas generator. For biogas production, it is preferred that the tank (10) should be sealed from the atmosphere, with one or more gas collection ports installed on top of the tank to collect the biogas. The biogas produced directly under the surge mixer is naturally collected by the surge mixer. Once the collected biogas within the surge mixer's gas chamber reaches a certain volume, the biogas drives the mixer, resulting a spontaneous and periodic mixing process without any external energy input. If more frequent mixing is needed, the produced biogas can be recycled back to the gas chamber of the surge mixer using a gas recycle pump.

Because the surge mixer reduces shearing of granular particles, the granular sludge may be formed within the reactor during the operation. This granular sludge is a concentrated form of highly active microorganisms. It also has high density. As a result, extremely high concentration of the highly active biomass can be maintained within the reactor, to significantly improve the bioreactor performance. Water and wastewater treatment media such as plastic media and other porous media (granular or powered activated carbon, for example) that can retain microorganisms (through attachment growth) can optionally be added to the reactor to enhance the biodegradation. The added media can be dispersed within the tank, and the surge mixer can effectively mix the media. The media can also be optionally packed above the surge mixer. In this case the surge flow can turn over the bed and mix the media, while reducing mechanical break up the media. Membrane filter(s) can also be used to retain microorganisms within the reactor, and the surge mixer can effectively remove the accumulated microorganisms on the membrane surface through strong surge action. The same or similar design in FIG. 4 can also be used for other purposes or in other industry. For example, it can be used in brewery industry to replace the existing reactors that use mechanical mixers. It can also be used in non-biological processes for water and wastewater treatment, by dispersing particulate reactants such as adsorbents (GAC, iron oxide, aluminum (hydr)oxide, etc.), oxidizing or reducing agents (such as zero valent ion), chemicals (such as alum), catalyzers (such as $TiO_2$), and the like within the tank. A combination of different media can also be used. For example, the coagulant and powered activated carbon combination can be used in some cases, to enhance the retention and biodegradation of some organic compounds that could be difficult to be removed otherwise.

Figure 5:
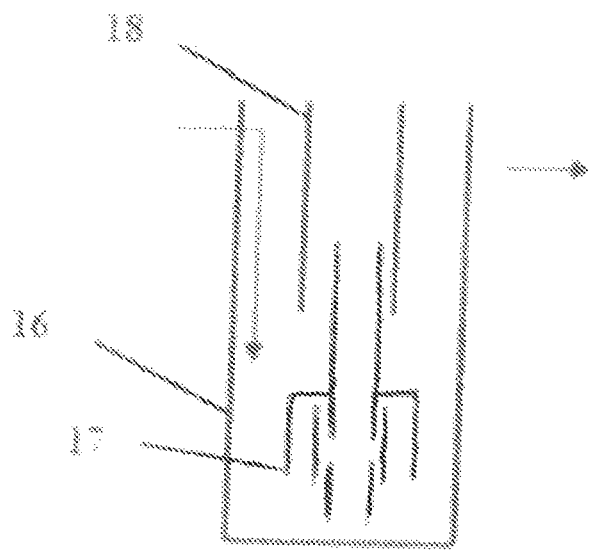
FIG. 5 is a cross sectional view of a bioreactor according to one embodiment of the disclosed invention.

FIG. 5 illustrates a cross-sectional side view of an alternative embodiment of the disclosed invention. Compared to FIG. 4 design, a baffle (18) is installed in the upper portion of the tank (16). When tank content is pumped out of the surge mixer (17) from the bottom of the reactor, it is re-directed back to the lower portion of the tank (16). Therefore, the upper portion of the tank (16), between the tank wall and the baffle, is under relatively static conditions. This static condition serves as a clarification zone for settling particles or thickening zone for sludge, which reduces the amount of sludge being washed out of the reactor, therefore retains more sludge within the reactor for needed reaction. In addition to the similar functions the FIG. 4 design can achieve, it can also be used as a solids-contact clarifier in some applications, to perform reaction and clarification within one tank. In addition, it can be used as an up-flow sludge blanket bed or filter to perform biodegradation and/or filtration, with improved influent distribution at the lower portion of the tank. For example, it can replace the primary clarifier in a biological nutrient removal process, to digest settled particles from the influent and produce low molecular weight soluble organic matter that is used as a carbon source needed for denitrification and/or biological phosphorus removal. This reactor can also be used to treat water or wastewater by adding activated carbon and/or other media, which forms a media blanket. The surge mixer improves the distribution of the water during its filtration through the media. This media blanket can retain both pollutants and microorganisms on the surface of the media, therefore enhances pollutant removal through adsorption, biodegradation, and other mechanisms.

Figure 6:
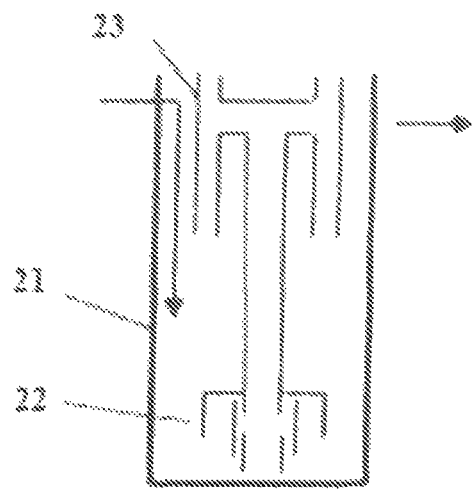
FIG. 6 is a cross sectional view of a bioreactor according to still another embodiment of the disclosed invention.

FIG. 6 illustrates a cross-sectional side view of an alternative embodiment of the disclosed invention. Compared to FIG. 4 design, multiple 3-way conduits (23) are installed on top of the surge mixer (22), to redirect the flow from the top of the surge mixer (22) back to the lower portion of the tank (21). These conduits (23) function like the baffle (18) in FIG. 5 design. Other baffle design can be used, as long as it can maintain part of the tank static.

Figure 7:
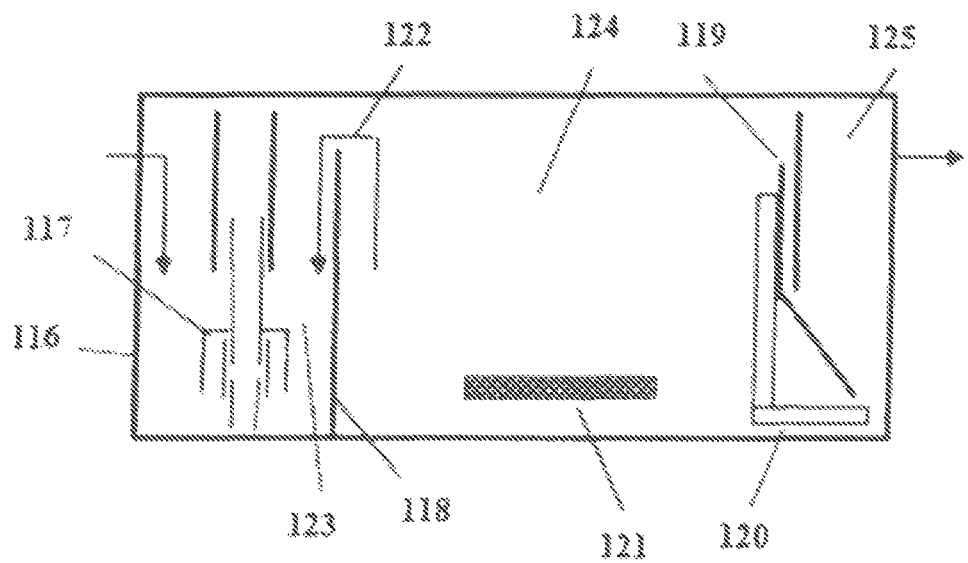
FIG. 7 is a cross sectional view of a bioreactor according to yet another embodiment of the disclosed invention.

FIG. 7 illustrates a cross-sectional side view of another embodiment of the disclosed invention. The bioreactor of this invention has a mixing zone (123) that is mixed using one or more serge mixers (117), followed by an aeration zone (124), then by a static zone (125). The mixing zone (123), the aeration zone (124), and the static zone (125) can optionally be located in separate tanks. For mixing zone (123) shown in FIG. 7, a baffle is installed to re-direct the surged liquid back to the lower portion of the mixing zone (123), and maintain a static condition at the upper portion of the mixing zone (123). This is used to retain as much biomass as possible for reaction, while making the lower portion of the mixing zone mixed. Highly active granular sludge may be formed in the mixing zone to further improve its performance. Other methods to retain biomass may be used (such as using three way pipes to maintain a static zone, and/or adding different types of media to improve solids retention). Influent flows into the lower portion of the mixing zone (123) where it mixes with established biomass within the mixing zone and/or that returned from the aeration zone (124) or static zone (125), to perform denitrification if the mixing zone is under an anoxic condition. If the mixing zone (123) is under partial or full anaerobic conditions, PAOs can also be cultured to uptake phosphorus in the following aeration zone (124).

The mixed liquor leaves the mixing zone (123) and enters the aeration zone (124) where organic matter is degraded and nitrification is performed if an appropriate sludge age is maintained. An aeration device (121) is used to impart oxygen to the aeration zone (124) for aerobic reactions. The aeration may optionally be controlled by the capacity of the aeration device, aerobic zone DO, ammonia concentration, or a combination thereof. If the aeration zone (124) is operated under a low DO, simultaneous nitrification and denitrification could occur within the aeration zone, to facilitate total nitrogen removal and oxygen recovery. In addition, the low DO and low nitrate in the return mixed liquor to the mixing zone (123) further enhances the denitrification performance of the mixing zone and may also make the mixing zone partially anaerobic, to cultivate phosphorus accumulating organisms (PAOs), therefore add biological phosphorus removal capability. As a result, low DO aeration results in less aeration energy use, and also improves nitrogen and phosphorus removal at the same time. An optional aerobic zone that is operated under a higher DO (>1 mg/L) can be added between the low-DO aeration zone (124) and static zone (125), to polish the low-DO mixed liquor by recharging oxygen before entering the static zone (125). This will facilitate the sludge settling within the static zone, and also further oxidize ammonia and improve biological phosphorus uptake. If this optional higher-DO aerobic zone is used, the sludge from the static zone (125) still return back to aeration zone (124) and/or mixing zone (123). If the sludge from the static zone (125) is directly returned to the mixing zone (123), the internal return of mixed liquor from the aeration zone (124) to the mixing zone (123) may be eliminated. No matter if the mixed liquor in the low-DO aeration zone (124) is returned to the mixing zone (123), this process has a no DO mixing stage, a low DO aeration stage, and high DO aeration stage, therefore can be termed as a 3-stage process.

The mixed liquor then flows to the static zone (125) through a conduit formed by a baffle group (119), or other conduits (such as pipes) that connect the aeration zone (124) and the static zone (125). The static zone (125) is used to settle biomass, and the settled biomass is returned back to aeration zone (124) or directly to the mixing zone (123) using mechanical or airlift pumps, shown as an airlift pump (120) in this particular embodiment due to its low head requirement. In particular, if a surge lifting device that could result in a pulsation action at the lower portion of the static zone (125) is used to return the settled sludge from the static zone (125), it could improve the sludge thickening within the static zone (125). If the sludge from the bottom of the static zone (125) is directly returned to the mixing zone (123), the mixed liquor return device (122) may be eliminated. If the bottom of the static zone (125) is open to the aeration zone (124) (in case both zones are in the same tank), settled sludge at the bottom of the static zone (125) can be automatically returned to the aeration zone (124) as a result of the air lifting force in the aeration zone (124), which creates a continuous return flow in the conduit connecting the aeration zone (124) to the lower portion of the static zone (125), to carry the settled biomass back to the aeration zone (124). In this case the sludge return device (120) may be eliminated. Sludge may be wasted from any zone.

A polishing clarifier can optionally be added after the static zone (125), to further remove solids carried out of the static zone (125). Normally, the solids carried out of the static zone (125) to the polishing clarifier have lower settling velocity. If part or all these lower-settling solids (e.g. lighter-weight solids) collected in the polishing clarifier are wasted, the static zone (125) and polishing clarifier combination can serve as a selector, to automatically retain heavier solid particles, including the granular sludge, within the bioreactor, and improve the reactor performance. Another aerobic zone can also be optionally added between the static zone (125) and the polishing clarifier, to recharge oxygen to the static zone effluent. This optional aerobic zone also breaks up any floating sludge carried out of the static zone (125), and facilitate sludge settling in the polishing clarifier. This aerobic zone may also facilitate biological phosphorus uptake and oxidation of residue ammonia if biomass is present. This optional aerobic zone can also be used to mix chemicals if chemicals are used to treat the static zone effluent. The settled solids from the polishing clarifier can also be optionally returned back to the mixing zone (123) and/or aeration zone (124).

If the static zone (125) is located in a separate tank, it is normally called a secondary clarifier. A sludge return device (120) should be used, to return settled sludge from the bottom of the static zone (125) to either the mixing zone (123) or the aeration zone (124). If the sludge is returned to the aeration zone (124), an internal mixed liquor return device (122) should not be eliminated. In this case the aeration zone (124) can also be called the aeration tank. The aeration zone (124) can be operated under a low DO, to improve energy efficiency and nutrient (nitrogen and phosphorus) removal. If low DO is maintained within the aeration zone (124), an aeration tank or zone that is operated under a higher DO (>1 mg/L) can optionally be added between the aeration zone (124) and the static zone (125), to polish the effluent from the aeration zone (124). The addition of this higher DO aeration tank or zone can facilitate secondary clarifier performance, ammonia oxidation, and phosphorus removal. No matter if this optional higher DO aeration tank or zone is used, the settled sludge from the static zone (125) should be returned back to the aeration zone (124) and/or mixing zone (123), using a pump device. Sludge may be wasted from any zones.

If the sludge from the static zone (125) is directly returned to the mixing zone (123), the internal return of mixed liquor from the aeration zone (124) to the mixing zone (123) may be eliminated. No matter if the mixed liquor in the low-DO aeration zone (124) is returned to the mixing zone (123), this process has a no DO mixing stage, a low DO aeration stage, and high DO aeration stage, therefore can be termed as a 3-stage process.

A polishing clarifier can optionally be added after the static zone (125), to further remove solids carried out of the static zone (125). Normally, the solids carried out of the static zone (125) to the polishing clarifier have lower settling velocity. If part or all these lower-settling solids (e.g. lighter-weight solids) collected in the polishing clarifier are wasted, the static zone (125) and polishing clarifier combination can serve as a selector, to automatically retain heavier solid particles, including the granular sludge, within the bioreactor, and improve the reactor performance. Another aerobic zone can also be optionally added between the static zone (125) and the polishing clarifier, to recharge oxygen to the static zone effluent. This optional aerobic zone also break up any floating sludge carried out of the static zone (125), and facilitate sludge settling in the polishing clarifier. This aerobic zone also facilitates biological phosphorus uptake and oxidation of residue ammonia. This optional aerobic zone can also be used to mix chemicals if chemicals are used to treat the static zone effluent. The settled solids from the polishing clarifier can also be optionally returned back to the mixing zone (123) and/or aeration zone (124).

Compared to other processes, bioreactors according to the disclosed invention use an energy-efficient surge mixer, driven by air and without any moving parts, to create periodic surge lifting action to mix the content within the mixing zone, therefore reduces the energy use and maintenance needs. It also create a condition that may form highly effective granular sludge to facilitate processes function. Moreover, if the optional baffle on the upper portion of the mixing zone is used, the baffle improves sludge retention within the mixing zone, therefore improves the anaerobic or anoxic reaction rate.

An additional mixing zone can optionally be placed ahead of the pre-anoxic mixing zone (123) to serve as an anaerobic mixing zone, and sludge from the static zone can be returned to either mixing zones or aerobic zone. Sludge return from the pre-anoxic mixing zone and from the aerobic zone may be needed, to allow the three reaction zones to be under anaerobic-anoxic-oxic conditions in series, and achieve both nitrogen removal and phosphorus removal. All mixings may be air-driven and can optionally perform surge lifting action. All return devices may also be air driven to simplify operation.

Figure 8:
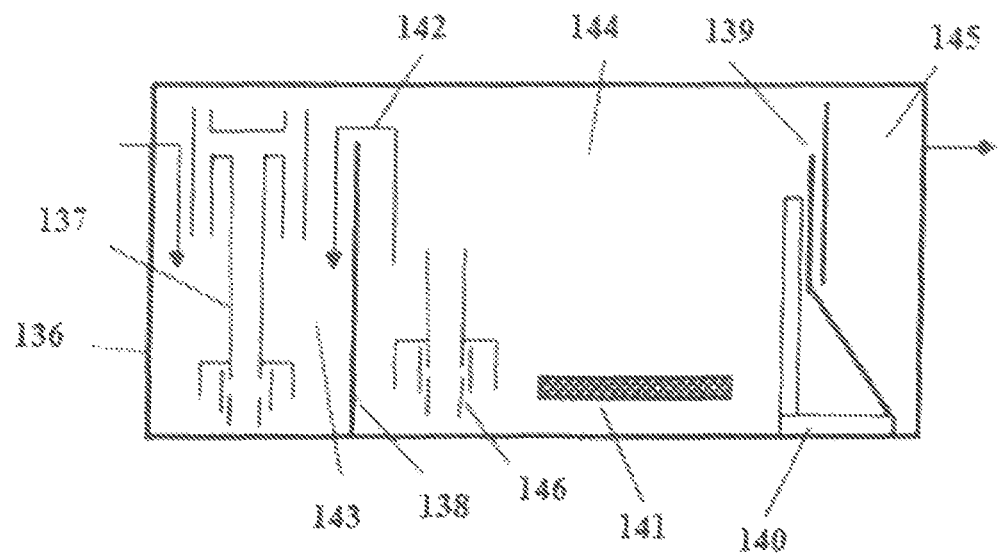
FIG. 8 is a cross sectional view of a biological treatment method according to one embodiment of the disclosed invention.

FIG. 8 illustrates a cross-sectional side view of another embodiment of the disclosed technology. Compared to FIG. 7 design, it adds mixing devices in the aerobic zone. Instead of maintaining continuous aerobic condition, the aeration device in zone (144) operates in a cycling on and off pattern, to create an alternating anoxic-oxic condition. Therefore, zone (144) is now called alternating aeration on/off zone. Influent enters the reactor mixing zone (143), and mixes with the content within the mixing zone and the return mixed liquor from the alternating aeration on/off zone (144) or static zone (145) by a surge mixer (137), which optionally uses 3-way conduits to maintain the upper portion of the mixing zone (143) static. Instead of using 3-way conduits, baffles can also be optionally used to maintain the upper portion of the mixing zone static. Other particular media may also be used to retain biomass within the mixing zone. The purpose of this front mixing zone is to enhance biological phosphorous removal and denitrification, and is operated under anaerobic and anoxic conditions, depending on the operation cycle of the aeration device (141). The tank content leaves the mixing zone (143) and enters the alternating aeration on/off zone (144), which is separated by a baffle (138). The mixing zone (143), alternating aeration on/off zone (144), and the static zone (145) could also be located in separate tanks for large flow applications.

The aeration device (141) in the alternating aeration on/off zone (144) is operated in a cycling on and off pattern for organic matter removal and nitrification when the aeration device is on, and for denitrification when the aeration device is off. The aeration can optionally be controlled by the capacity of the aeration device, DO and/or ammonia concentration within the aerobic zone. The mixing device (146) in the alternating aeration on/off zone (144) is operated at least during the aeration-off period to provide mixing. The mixing device (146) within the alternating aeration on/off zone shown in this design is a surge lifting device, but it can also be other types of mixing devices. When the alternating aeration on/off zone is under aerobic condition (the aeration device is on), the mixing zone (143) is likely under anoxic condition. When the alternating aeration on/off zone is operated in the anoxic condition (without aeration but with mixing), the mixing zone (143) may be under anaerobic condition because there is no dissolved oxygen in the return mixed liquor, and the nitrate concentration is also low due to the additional denitrification within the aeration on/off zone during the aeration off period. Therefore, this mixing zone (143) is operated under alternating anaerobic-anoxic condition, corresponding to the anoxic-oxic condition of the alternating aeration on/off zone (144). Through the mixing zone and the alternating aeration on/off zone combination, the reactor can achieve comprehensive nitrogen and phosphorus removal. The mixed liquor leaves the alternating aeration on/off zone (144) and enters the static zone (145). Sludge may be wasted from the alternating aeration on/off zone right before the aeration is stopped, to ensure the maximum phosphorus uptake by the sludge. An aerobic zone or tank that is continuously aerated can optionally be added between the alternating aeration on/off zone (144) and the static zone (145), to further improve the reactor performance. This aerobic zone can recharge oxygen to the mixed liquor exiting the alternating aeration on/off zone. This will help to improve the sludge settling characteristics within the static zone (145). In addition, some ammonia or organic nitrogen entering the alternating aeration on/off zone (144) during the aeration off period is not oxidized, therefore the added continuously aerated zone should be used to oxidize this fraction of ammonia or organic nitrogen before solid-liquid separation if low ammonia discharge limit is required. Moreover, during aeration off period, some phosphorus will release from the sludge. This continuously aerated zone is used to re-uptake the released phosphorus during the aeration off period. Sludge may be wasted from this continuous aeration zone, to ensure the maximum phosphorus uptake by the sludge.

Sludge solids settled to the bottom of the static zone (145) are returned to the alternating aeration on/off zone (144) through a pump (140), shown is an air lift pump (although other types of pumps may also be used). The sludge can also be optionally directly returned to the mixing zone (143). If the settled sludge in static zone (145) is directly returned to the mixing zone (143), the mixed liquor return device (142) may be limited. The sludge return pump (140) can also be a mechanical pump or a surge lift pump. Supernatant in the static zone (145) leaves the reactor as effluent, and an optional polishing clarifier can be used to treat the effluent from the static zone (145), to further remove solids carried out of the bioreactor. Normally, the solids carried out of the static zone (145) to the polishing clarifier have lower settling velocity. If part of all these lower-settling solids (e.g. lighter-weight solids) collected in the polishing clarifier are wasted, the static zone (145) and the polishing clarifier combination can serve as a selector, to automatically retain heavier solid particles, including the granular sludge, within the bioreactor, and improve the reactor performance. Another aerobic zone can also be optionally added between the static zone (145) and the polishing clarifier, to recharge oxygen to the static zone effluent. This optional aerobic zone can also break up any floating sludge carried out of the static zone (145), and facilitate sludge settling in the polishing clarifier. This optional aerobic zone also facilitates biological phosphorus uptake and oxidation of residue ammonia. This optional aerobic zone can also be used to mix chemicals if chemicals are used to treat the static zone effluent. The settled solids from the polishing clarifier can also be optionally wasted or returned back to the mixing zone or (143) and/or the alternating aeration on/off zone (144).

The mixing zone (143), alternating aeration on/off zone (144), and static zone (145) can also be optionally located in different tanks. A continuously aerated tank or zone can optionally be added between the alternating aeration on/off zone (144) and static zone (145), to facilitate sludge settling, ammonia and organic nitrogen oxidation, and phosphorus removal. Another polishing clarifier can optionally be added after the static zone (145) to further removal sludge, and sludge in this polishing clarifier can optionally be wasted, or be returned back to the mixing zone and/or alternating aeration on/off zone. An aerobic tank or zone can also be optionally added before this polishing clarifier, to improve the sludge settling performance within the polishing clarifier. This aerobic tank or zone also facilitates biological phosphorus uptake and oxidation of residue ammonia. This optional aerobic zone can also be used to mix chemicals if chemicals are used to treat the static zone effluent.

Compared to the embodiment shown in FIG. 7, FIG. 8 has a cycling aeration on and off operation pattern in the alternating aeration on/off zone. The nitrate/nitrite in the alternating aeration on/off zone can be denitrified within the same zone during the aeration-off period. In addition, the preceding mixing zone (143) can be more easily maintained at an anaerobic condition during the aeration off period, as a result of the more complete denitrification of the mixed liquor within the alternating aeration on/off zone. Compared to conventional anaerobic-anoxic-oxic ($A^2O$) process or the University of Cape Town (UCT) process that have three zones or tanks in the bioreactor, the present invention only has two zones or tanks and less return streams. Therefore, the present invention is easier to construct and operate. In addition, during the aeration-off period the entire alternating aeration on/off zone is under anoxic condition, therefore the nitrate/nitrite species can be completely denitrified, the final effluent should have a lower total nitrogen concentration than that from $A^2O$ and UCT processes. Ammonia and/or nitrate within the alternating aeration on/off zone (144) can optionally be used as an indicator to control the operation of the aeration device (141). Maintaining a low DO during the aeration period can save energy and promote sustainability for wastewater treatment.

Figure 9:
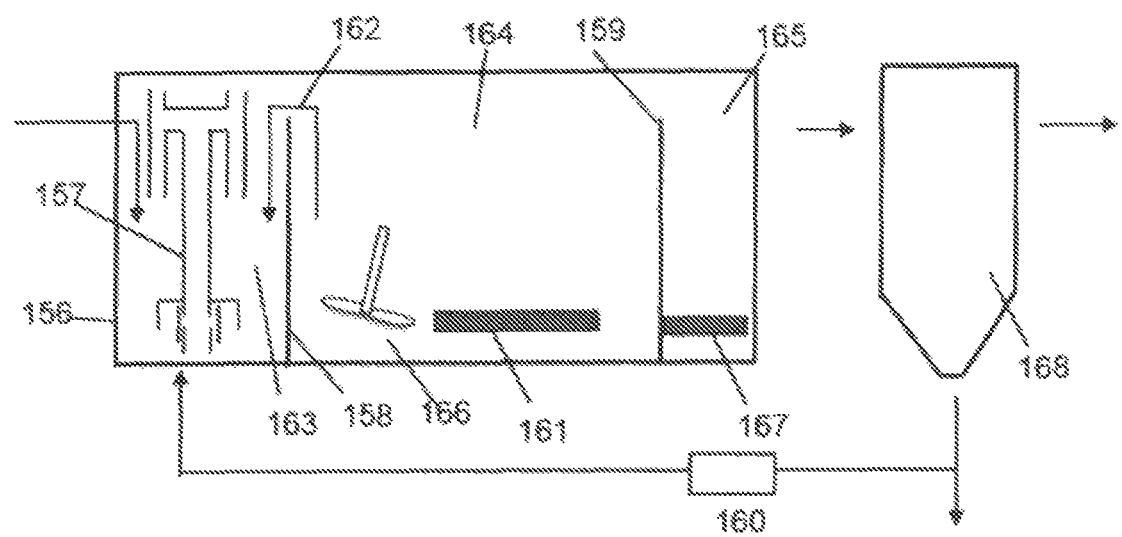
FIG. 9 is a cross sectional view of a biological treatment method according to one embodiment of the disclosed invention.

FIG. 9 illustrates a cross-sectional side view of another embodiment in accordance with the disclosed technology. Compared to the FIG. 8 embodiment, it adds a continuously aerated aerobic zone (165) at the end of the alternating aeration on/off zone (164), to recharge oxygen to the mixed liquor, facilitating solid-liquid separation, complete nitrification, and biological phosphorus uptake. Sludge may be wasted from the aerobic zone (165). In addition, the solid-liquid separation is performed in a different tank, or a secondary clarifier (168). The settled sludge in the secondary clarifier is optionally returned to the mixing zone (163) through a sludge return pump (160), which could be any pump device including mechanical pump or airlift pump. In this case the mixed liquor return device (162) may be eliminated. The settled sludge can also be optionally returned to the alternating aeration on/off zone (164). Excess sludge can optionally be removed from the secondary clarifier (168) as shown in FIG. 9.

An optional polishing clarifier can be added to further treat the effluent from the secondary clarifier (168). In this case the secondary clarifier (168) is used to maintain sludge mass in the reaction tank, and the polishing clarifier is used to collect light-weight solids, which are optionally wasted out of the process. This two clarifier combination will serve as a selector, to keep heavier particles, including the granular sludge, within the process, to improve the treatment performance. An aerobic tank or zone can also be optionally added between the secondary clarifier (168) and the polishing clarifier, to improve sludge removal, phosphorus removal, and ammonia removal. It can also be used to mix chemicals if chemicals are used to treat the effluent from the secondary clarifier (168).

Figure 10:
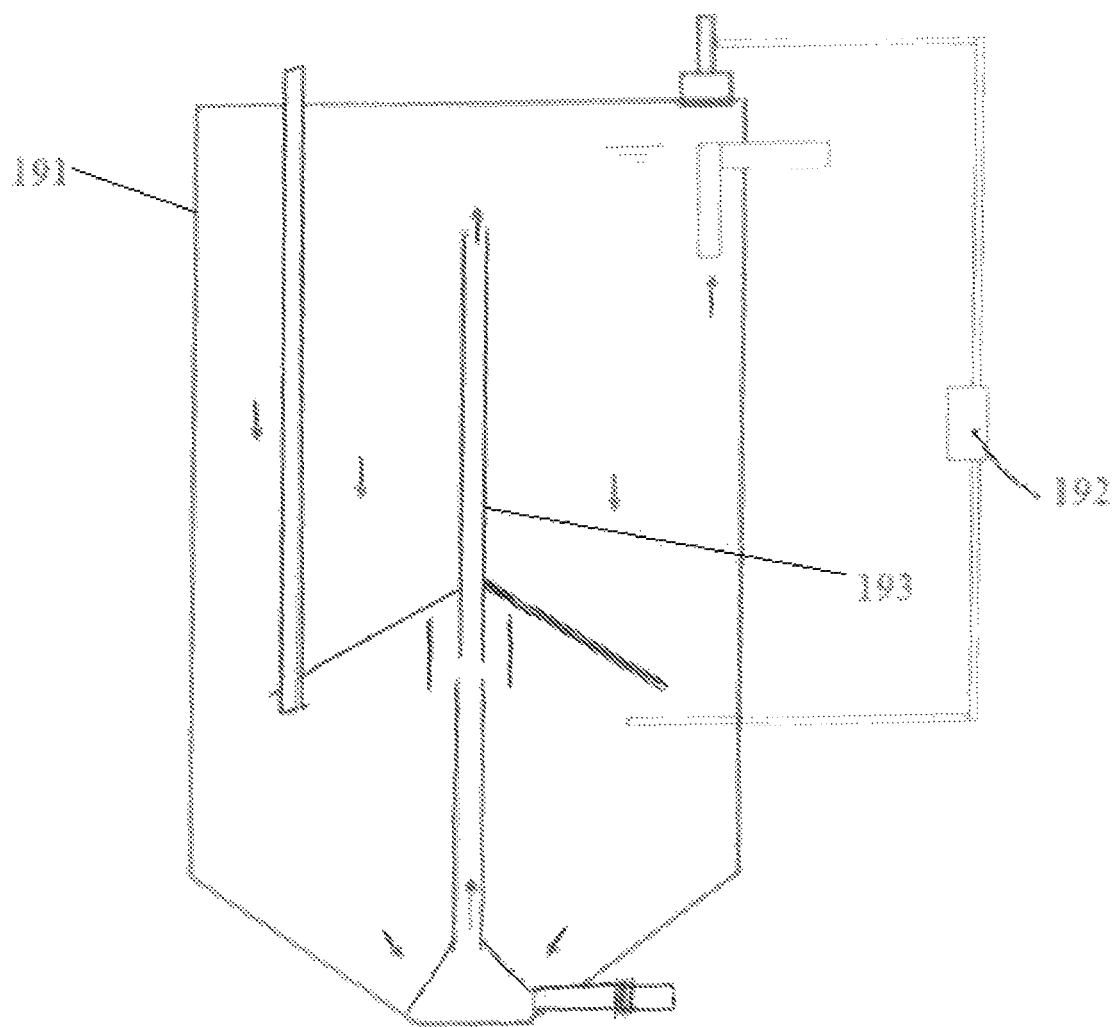
FIG. 10 is a cross sectional view of a bioreactor according to another embodiment of the disclosed invention.

FIG. 10 illustrates a cross-sectional side view of another embodiment in accordance with the disclosed technology. It comprises a sealed tank (191) and a surge mixer (193) that is designed to collect biogas under it. It also has an optional means to return biogas (192) from the top of the reactor vessel (191) to somewhere under the collar of the surge mixer (193), to increase the surge mixing frequency of the surge mixer (193). Side baffle(s) can also be optionally installed below the gas chamber of the surge mixer (193) to increase gas collection and improve the mixing. Baffle(s) can also be optionally installed on the upper portion of the tank, similar to that disclosed in FIG. 5, to create a static zone and facilitate solids retention. In some cases the gas collection chamber of the surge mixer (also refers as gas collar of the surge mixer) is near the bottom of the reactor vessel (191), and the amount of gas automatically collected from the tank space below it is very minimal. Therefore, gas will should be returned from the top of the reactor vessel, to initiate the surge action for tank mixing.

Figure 11:
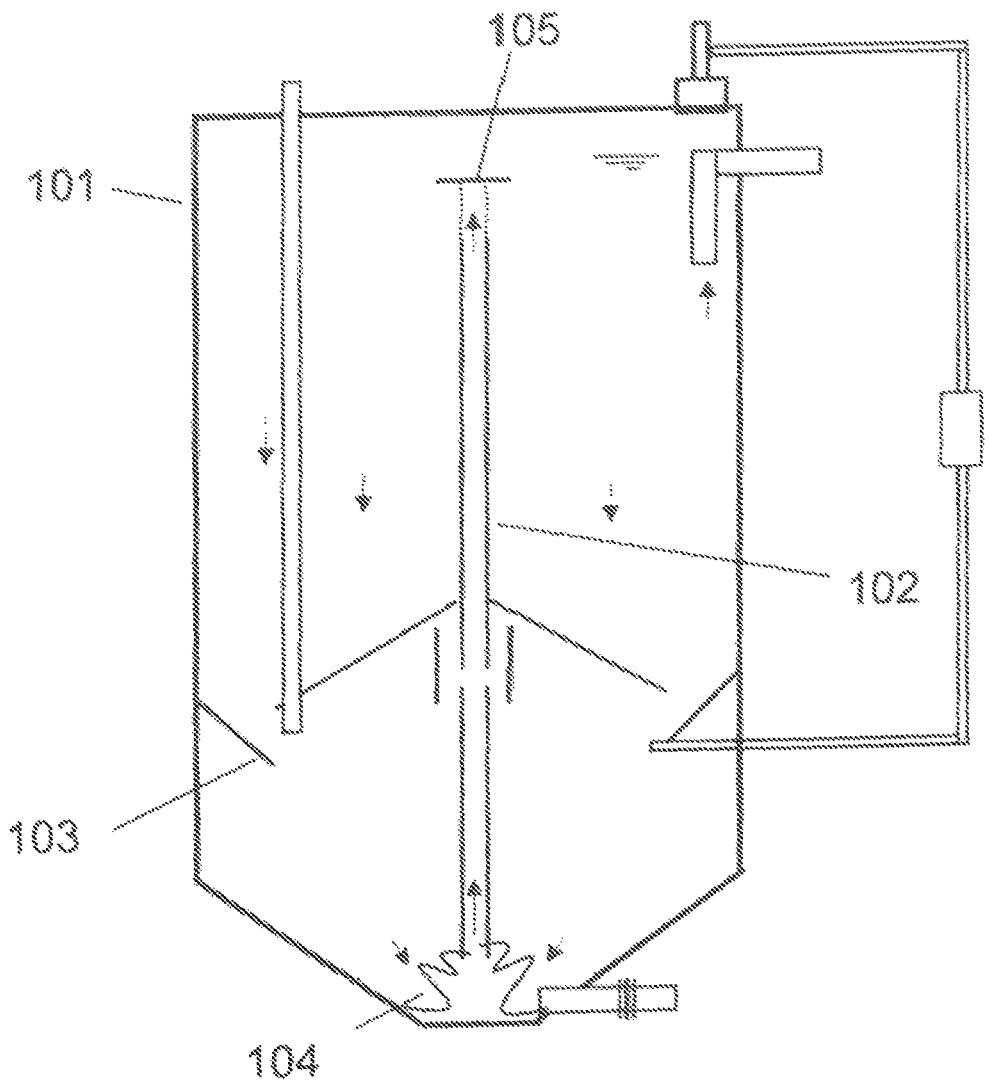
FIG. 11 is a cross sectional view of a biological treatment method according to another embodiment of the disclosed invention.

FIG. 11 illustrates a cross-sectional side view of yet another embodiment in accordance with the disclosed technology. In addition to the components shown in FIG. 10, FIG. 11 shows the side baffle (103) which is used to collect most gas generated bellow the gas collection collar. In addition, the surge mixer (102) is connected to the tank through a spring mechanism (104). This spring mechanism can also be optionally installed on the top of the surge mixer and against the top of the tank. Moreover, a force mitigation plate (105) is installed above the outlet of the surge lifting device (102), to reduce the impact of surge to the top of the reaction vessel (101). When the surge flow hit the mitigation plate (105), it will provide an impact to the entire surge mixer (102) and make it vibrate, enhancing the mixing.

Figure 12:
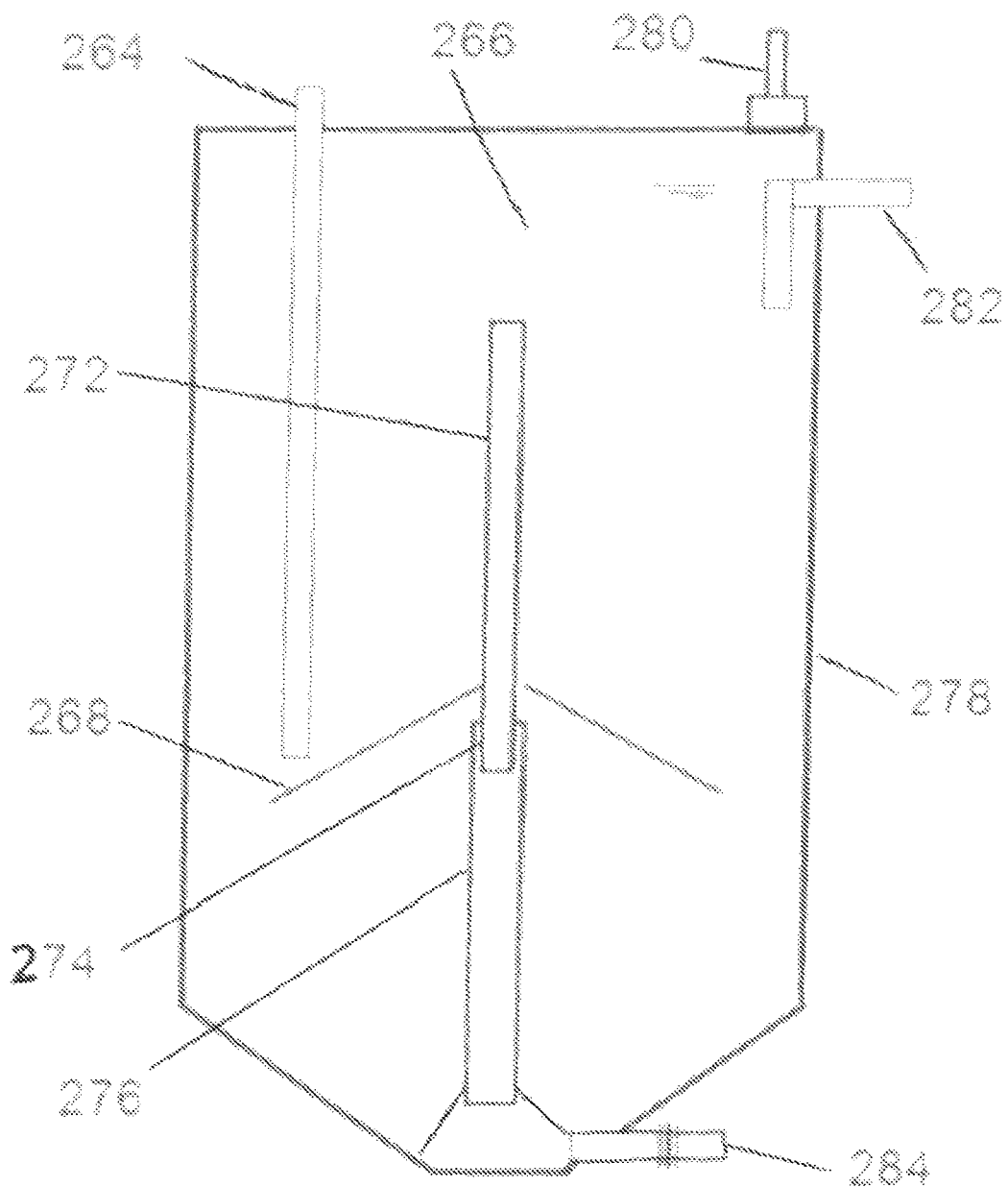
FIG. 12 is a cross sectional view of a reactor and lift device according to one embodiment of the disclosed invention.

FIG. 12 illustrates a cross-sectional side view of another embodiment in accordance with the disclosed technology. This particular embodiment shows an automatic surge mixing device (272) with a different design. Feed is introduced into the reactor via inlet (264). There it mixes with, and is consumed by, anaerobic bacteria which produce biogas. As gas bubbles generated under the gas collection collar they float upward, and are captured by the gas collection collar (268). The gas expands in volume until it reaches the bottom of the upper riser (272). At this point the gas flows through the gas conduit (274) created by the lower riser (276) extending over the upper riser (272), and into the upper riser (272). As the gas travels through the upper riser (272) it pulls solids from the bottom of the reactor and deposits them at the top, recycling the tank content therefore effectively mixing the reactor. Accumulated gas leaves the reactor via gas outlet (280). Effluent from the reactor leaves through the outlet (282), and the reactor can be drained through the drain (284). All of the optional components described in the discussion of FIGS. 10-11 may be included in this embodiment as well.

Figure 13:
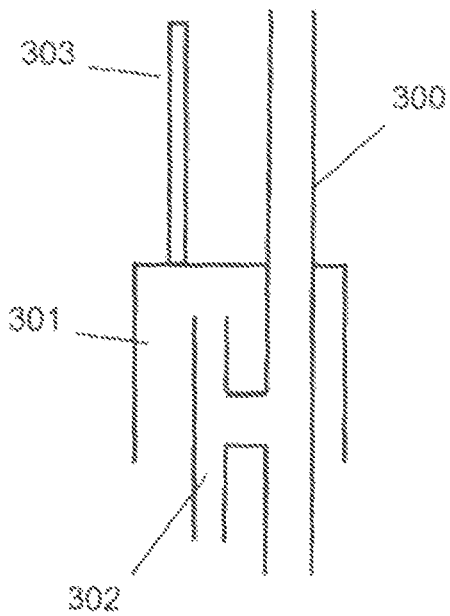
FIG. 13 is a cross sectional view of a reactor and lift device according to one embodiment of the disclosed invention.

FIG. 13 illustrates a cross-sectional side view of one embodiment of an air- or gas-lift device to lift liquid and liquid mixtures (sludge, mud, oil, sediment, or particles in liquid). This embodiment collects and stores gas (could be air, biogas, or other gases) in the gas collection chamber (301) to a certain volume, then releases it through the T-shaped conduit (302) to the riser tube (300) at once, to form a large gas plug inside the riser tube (300) and create a strong lifting motion, pulling liquid content from the bottom to the top of the riser tube (300). If the gas is continuously supplied, this lifting motion repeats periodically. Therefore, this device is termed surge lifting device herein to differentiate it with conventional continuous flow airlift devices. It can also be called surge mixer if used for mixing, or surge pump if used for liquid transfer. Gas enters the gas collection chamber (301) through either an optional gas supply line (303) as shown or by rising from a source below the device (not shown). In some applications the housing of the gas collection chamber (301) or the bottom of the riser tube (300) can be further extended to other locations, to draw liquid from different places.

During operation, the gas is initially collected by and stored in the gas collection chamber (301). The volume of the gas expands and the gas-liquid interface moves downward. At some point the gas leaks to the riser tube through the conduit (302), shown as a T-shaped tube, causing an initial lift within the riser tube (300). This initial lift further pulls the entire volume of the gas within the gas collection chamber (301) into the riser tube (300) at once, creating a gas plug within the riser tube therefore a significant lifting action, e.g. surge lifting action. This surge lifting action pulls the tank content from the bottom of the riser tube and releases it to anywhere above the top. Therefore, this surge lifting device can optionally be used to transport liquid, liquid mixtures, sludge, particles in liquid, etc. from one location to another, and can also be used to perform tank mixing, or to simply generate large gas bubbles if desired.

Figure 3:
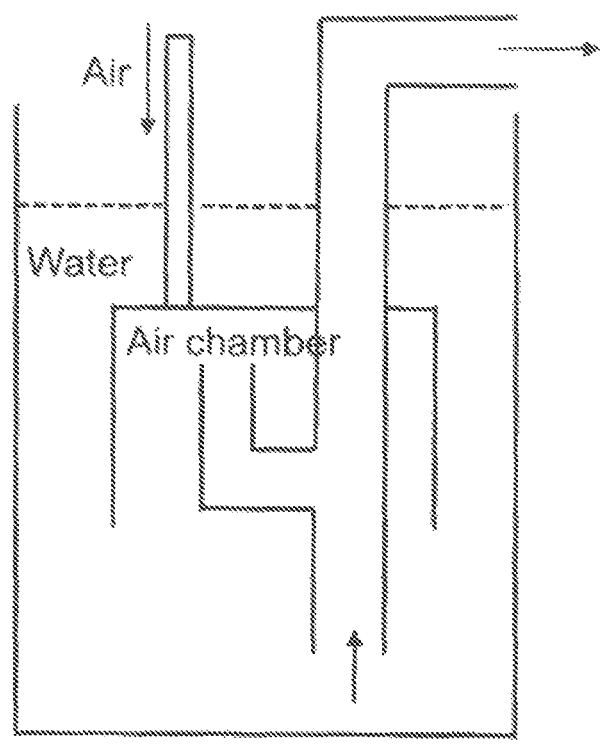
FIG. 3 is a cross sectional view of an airlift pump from U.S. Pat. No. 6,162,020.
Figure 14:
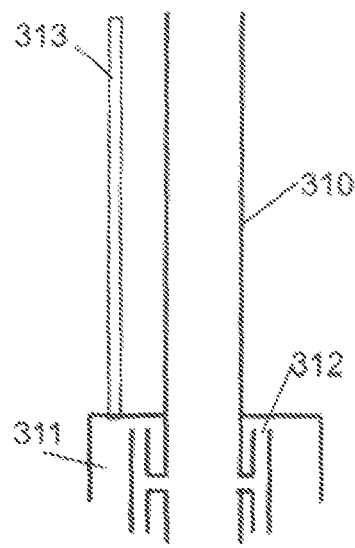
FIG. 14 is a cross sectional view of a reactor and lift device according to another embodiment of the disclosed invention.

Compared to a disclosed device shown in FIG. 3, the embodiment shown in FIG. 13 employs a 3-way conduit rather than an elbow. This improvement significantly reduces the chance of clogging when it is used to mix or transport liquid that has debris. In case of clogging, FIG. 13 design is very easy to clean, because the top of the 3-way conduit is easily accessible. FIG. 14 illustrates a cross-sectional side view of an alternative embodiment of an air- or gas-lift type device to lift liquid and liquid mixtures (sludge, mud, oil, or particles in liquid). It has the same function as the FIG. 13 embodiment, but it has two 3-way conduits, which make it even less likely to be clogged. In case one of the conduit is clogged, the pump is still functional using the second 3-way conduit. Overtime, the clogged conduit will be gradually un-plugged either from the top or from the bottom of the clogged 3-way conduit through repeatedly pulling and pushing actions during the surge.

Figure 15:
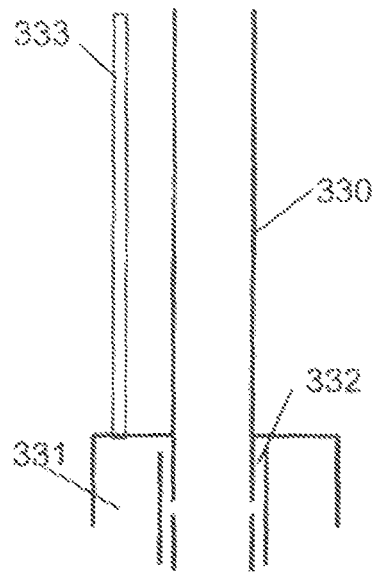
FIG. 15 is a cross sectional view of a liquid lift device according to an embodiment of the disclosed invention.

FIG. 15 illustrates a cross-sectional side view of an alternative embodiment of an air- or gas-lift type device to lift liquid and liquid mixtures (sludge, mud, oil, or particles in liquid). Compared to FIG. 14 embodiment, it uses baffles (332) to replace the 3-way conduits to achieve the same function. This design reduces the overall size of the device, and is easier to build. The low edge of the housing of the gas chamber (331) can be extended to other locations, to draw liquid from other places. The bottom of the riser tube (330) can also be extended to other locations.

Figure 16:
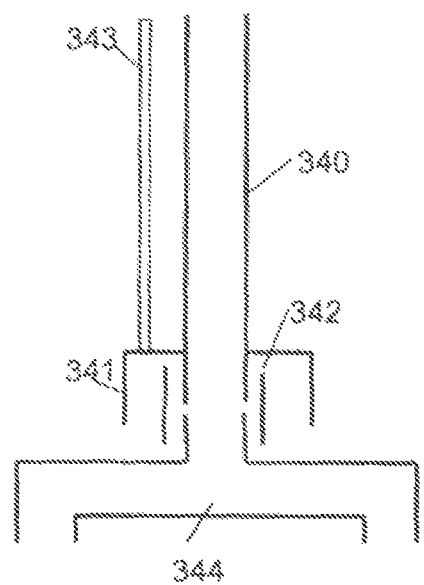
FIG. 16 is a cross sectional view of a liquid lift device according to another embodiment of the disclosed invention.

FIG. 16 illustrates a cross-sectional side view of an alternative embodiment of an air- or gas-lift type device to lift liquid and liquid mixtures. Compared to FIG. 15 embodiment, a T-shaped pipe (344) is connected to the bottom of the riser tube. It is an example to extend the bottom of the riser tube, and can be used to increase the impact area when mixing function is used.

Figure 17:
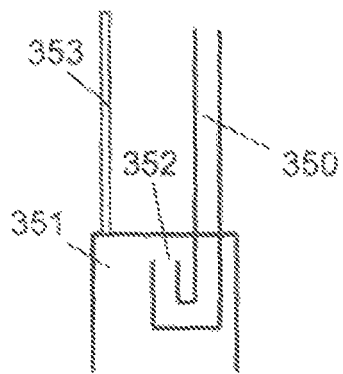
FIG. 17 is a cross sectional view of a liquid lift device according to yet another embodiment of the disclosed invention.

FIG. 17 illustrates a cross-sectional side view of another embodiment of an air- or gas-lift type device to lift liquid and liquid mixtures. Different from the early art disclosed in FIG. 3, the riser tube in FIG. 17 design (350) has a closed bottom. It is actually connecting the riser tube with a U-shaped conduit at the bottom, therefore it is easy to build.

Figure 18:
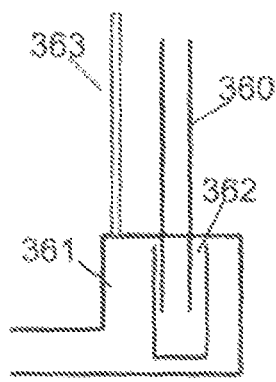
FIG. 18 is a cross sectional view of a liquid lift device according to still another embodiment of the disclosed invention.

FIG. 18 illustrates a cross-sectional side view of another embodiment of an air- or gas-lift type device to lift liquid and liquid mixtures. It has the similar function as the embodiment shown in FIG. 17. However, the housing of the air chamber (361) extends to a different direction. This is an example for how the housing can be extended to other places for all the surge lifting devices.

Figure 19:
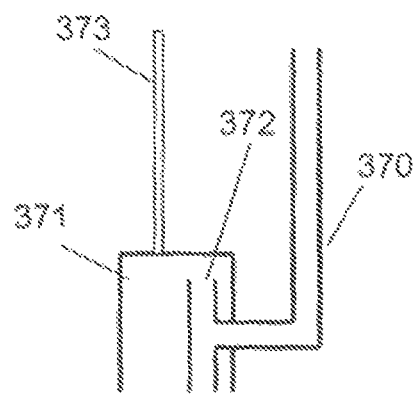
FIG. 19 is a cross sectional view of a liquid lift device according to a further embodiment of the disclosed invention.

FIG. 19 illustrates a cross-sectional side view of another embodiment of an air- or gas-lift type device to lift liquid and liquid mixtures. It has the similar function as the embodiment shown in FIG. 13-18. However, it uses a 3-way conduit (372) to transfer gas to the riser that has a closed bottom (370).

While the claimed technology has been illustrated and described in detail in the drawings and foregoing description, the same is to be considered as illustrative and not restrictive in character. It is understood that the embodiments have been shown and described in the foregoing specification in satisfaction of the best mode and enablement requirements. It is understood that one of ordinary skill in the art could readily make a nigh-infinite number of insubstantial changes and modifications to the above-described embodiments and that it would be impractical to attempt to describe all such embodiment variations in the present specification. Accordingly, it is understood that all changes and modifications that come within the spirit of the claimed technology are desired to be protected.

What is claimed is:

1. An apparatus for treating water and wastewater, comprising:
   (a) a tank having an inlet and an outlet;
   (b) a mixing zone that comprises one or more surge mixer;
   (c) an alternating aeration zone downstream of said mixing zone having an aeration device operated in an on/off cycle and a means for mixing;
   (d) a static zone downstream of said alternating aeration zone;
   (e) an aerobic zone between said alternating aeration zone and said static zone;
   (f) a means for returning sludge from said static zone to said mixing zone;
   (g) wherein said one or more surge mixer is driven by gas and is able to create periodic surge lifting action to recycle tank content within said mixing zone.

2. The apparatus of claim 1, further comprising a means to retain biomass within said mixing zone.

3. The apparatus of claim 1, wherein said means of mixing within said alternating aeration zone operates at least when said aeration device is off.

4. The apparatus of claim 1, wherein said means of returning sludge from said static zone to said mixing zone operates through the following two operations:
   (a) returning sludge from said static zone to said alternating aeration zone; and,
   (b) returning mixed liquor from said alternating aeration zone to said mixing zone.

5. The apparatus of claim 1, wherein said one or more surge mixer in the mixing zone comprises:
   (a) a riser tube;
   (b) a gas collection chamber;
   (c) a conduit connecting an upper location of said gas collection chamber to said riser tube at a location below the top of said conduit and able to deliver gas from said gas collection chamber to said riser tube before the gas escapes from said gas collection chamber through other means.

6. An apparatus for treating water and wastewater comprising:
   (a) a tank having an inlet and an outlet;
   (b) a means separating said tank into a mixing zone, an aeration zone, and a static zone;
   (c) a means to return settled sludge from said static zone to said mixing zone by returning sludge from said static zone to said aeration zone and returning mixed liquor from said aeration zone to said mixing zone;
   (d) wherein said mixing zone comprises one or more surge mixer and is connected to the inlet of the tank;
   (e) wherein said aeration zone comprises an aeration device;
   (f) wherein said static zone is connected to the outlet of the tank;
   (g) wherein said one or more surge mixer is driven by gas and is able to create periodic surge lifting action to mix tank content within said mixing zone;
   (h) wherein aeration via said aeration device may optionally be controlled by the capacity of said aeration device, aerobic zone DO, ammonia concentration, or a combination thereof.

7. The apparatus of claim 6, wherein said aeration zone is operated under a low dissolved oxygen.

8. The apparatus of claim 6, wherein a means to return settled sludge from said static zone to an upstream zone is accomplished by air lift force.

9. The apparatus of claim 6, wherein a means of utilizing multiple mixing zone and/or aeration zone combinations is employed with influent being applied to at least one mixing zones and sludge being returned from said static zone to at least the mixing zone farthest upstream.

10. The apparatus of claim 6, wherein controlling said aeration device in said aeration zone is based on at least the ammonia concentration in the aeration zone.

11. The apparatus of claim 7, further comprises a second aeration zone between said low dissolved oxygen aeration zone and said static zone.

12. The apparatus of claim 10, further comprising a means to control sludge wasting based on the dissolved oxygen concentration within said aeration zone.

13. The apparatus of claim 6, wherein said one or more surge mixer in the mixing zone comprises:
   (a) a riser tube;
   (b) a gas collection chamber;
   (c) a conduit connecting an upper location of said gas collection chamber to said riser tube at a location below the top of said conduit and able to deliver gas from said gas collection chamber to said riser tube before the gas escapes from said gas collection chamber through other means.

14. An apparatus comprising:
   (a) a tank having a feed inlet and an effluent outlet;
   (b) a mixing zone that comprises one or more surge mixer;
   (c) wherein said one or more surge mixer comprises a riser tube, a gas collection chamber, and at least one open top and open lower end baffle with its top connecting an upper location of said gas collection chamber and its lower end connecting the liquid below; wherein said baffle is in fluid communication with said riser tube at a location between the top and the lower end of said baffle.

15. The apparatus of claim 14, further comprising a means to return gas back to said one or more surge mixer.

16. An apparatus for mixing liquid comprising:
   (a) a riser tube;
   (b) a gas collection chamber;
   (c) at least one open top and open lower end baffle with its top connecting an upper location of said gas collection chamber and its lower end connecting a location below said baffle in fluid communication with said riser tube at a location between the top and lower end_of said baffle and able to deliver gas from said gas collection chamber and liquid from below said baffle to said riser.

* * * * *